United States Patent
Fukui et al.

(10) Patent No.: US 11,881,198 B2
(45) Date of Patent: Jan. 23, 2024

(54) NOISE INSULATION MATERIAL FOR AUTOMOBILE

(71) Applicant: KOTOBUKIYA FRONTE CO., LTD., Tokyo (JP)

(72) Inventors: Kazuki Fukui, Saitama (JP); Nobuyuki Takahashi, Saitama (JP)

(73) Assignee: KOTOBUKIYA FRONTE CO., LTD.

( * ) Notice: Subject to any disclaimer, the term of this patent is extended or adjusted under 35 U.S.C. 154(b) by 412 days.

(21) Appl. No.: 17/270,105

(22) PCT Filed: Jan. 22, 2019

(86) PCT No.: PCT/JP2019/001787
§ 371 (c)(1),
(2) Date: Feb. 22, 2021

(87) PCT Pub. No.: WO2020/084802
PCT Pub. Date: Apr. 30, 2020

(65) Prior Publication Data
US 2021/0183350 A1    Jun. 17, 2021

(30) Foreign Application Priority Data
Oct. 26, 2018    (JP) .................................. 2018-202014

(51) Int. Cl.
*G10K 11/168* (2006.01)
*B60R 13/08* (2006.01)

(52) U.S. Cl.
CPC ........ *G10K 11/168* (2013.01); *B60R 13/0815* (2013.01); *B60R 13/0838* (2013.01)

(58) Field of Classification Search
CPC .............. G10K 11/168; B60R 13/0815; B60R 13/0838
See application file for complete search history.

(56) References Cited

U.S. PATENT DOCUMENTS

| 2004/0069564 | A1 | 4/2004 | Wang et al. |
| 2005/0126852 | A1* | 6/2005 | Nakajima ........... B29C 65/1432 |
| | | | 181/293 |

(Continued)

FOREIGN PATENT DOCUMENTS

| FR | 3019784 A1 * | 10/2015 | ......... B60R 13/0838 |
| JP | 2005239813 A | 9/2005 | |

(Continued)

OTHER PUBLICATIONS

International Search Report for Application No. PCT/JP2019/001787, dated Mar. 29, 2019, 3 oages.

(Continued)

*Primary Examiner* — Forrest M Phillips
(74) *Attorney, Agent, or Firm* — Lerner David LLP

(57) ABSTRACT

A sound-insulation material for a vehicle has high rigidity and is capable of exhibiting sufficient sound insulation performance against noise having a frequency of 500 Hz to 5000 Hz generated in a vehicle, while maintaining low weight. The sound-insulation material for a vehicle of the present invention has a multilayer structure, the material including: a hard layer having tubular cells, the tubular cells being arranged in a plurality of rows; and a soft layer provided on one surface of the hard layer, in which a ratio of a dynamic spring constant Kd to a static spring constant Ks, of a structure having the hard layer and the soft layer, is $0 < Kd/Ks \leq 1.5$.

7 Claims, 6 Drawing Sheets

(56) References Cited

U.S. PATENT DOCUMENTS

2006/0289231 A1* 12/2006 Priebe .................... B32B 3/266
                                                      181/290
2008/0176027 A1   7/2008 Pflug et al.
2010/0247848 A1   9/2010 Hotzeldt et al.

FOREIGN PATENT DOCUMENTS

| | | | |
|---|---|---|---|
| JP | 2005266399 A | | 9/2005 |
| JP | 2008260309 A | | 10/2008 |
| JP | 2009154732 A | | 7/2009 |
| JP | 2009538746 A | | 11/2009 |
| JP | 2011027169 A | | 2/2011 |
| JP | 2011180381 A | | 9/2011 |
| JP | 2012026260 A | | 2/2012 |
| JP | 2013028085 A | | 2/2013 |
| JP | 2013177500 A | | 9/2013 |
| JP | 2014211640 A | | 11/2014 |
| JP | 2017065026 A | | 4/2017 |
| KR | 20170099276 A | * | 8/2017 ............... B32B 3/20 |

OTHER PUBLICATIONS

Search Report for European Application No. 19876657.8 dated Nov. 4, 2021. 2 pgs.

* cited by examiner

NOISE INSULATION MATERIAL FOR AUTOMOBILE

CROSS-REFERENCE TO RELATED APPLICATIONS

The present application is a national phase entry under 35 U.S.C. § 371 of International Application No. PCT/JP2019/001787 filed Jan. 22, 2019, published in Japanese, which claims priority from Japanese Patent Application No. 2018-202014 filed Oct. 26, 2018, all of which are incorporated herein by reference.

TECHNICAL FIELD

The present invention relates to a sound-insulation material for vehicles.

BACKGROUND ART

A typical structure of a vehicle has an engine compartment provided at the front, a trunk compartment provided at the rear, and a passenger compartment provided in the middle thereof. The passenger compartment is provided with seats such as a driver seat, a front passenger seat, and a rear seat. In addition, the passenger compartment has a dash insulator, a floor carpet, a floor spacer, a trunk trim, and a trunk floor installed so that they cover the outside of the vehicle interior. These components are formed in uneven shapes according to shapes of vehicle bodies or designs of components. Furthermore, the exterior under a vehicle body has a front fender liner, a rear fender liner, and an undercover that is formed in an uneven shape for controlling the air flow, installed thereon. For many of these components, a thermoplastic resin is used as a material, and each of the materials is heated and press-molded by a die having the shape of the component to be finished into an uneven-shaped component having a plurality of portions with different thicknesses.

As a recent trend of vehicle development, the quietness in the interior of a vehicle is emphasized. Noise transmitted to the interior of a vehicle includes noise from the windows, noise from the tires, noise from under the vehicle body, noise from engine sounds, and noise from motor sounds. It is said that noise, particularly at frequencies of 500 Hz to 5000 Hz, causes annoyance to drivers and passengers. Therefore, the interior and exterior components of vehicles are required to have a function of absorbing and insulating noise in these frequency bands. On the other hand, it is also important to reduce fuel consumption, and it is also required to reduce weight of interior and exterior components of vehicles.

JP 2009-538746 A describes a sandwich element for a sound-absorbing inner cladding of aircraft fuselage cells, including a honeycomb-shaped core structure and cover layers applied to both sides of the core structure, in which both the cover layers each have a plurality of passages for sound transmission, in which a covering formed using a semi-permeable membrane of a plastic material is disposed on the cover layer facing to the sound, in which the semi-permeable membrane made of the plastic material includes a plurality of openings with a cross-sectional area such that the penetration of foreign bodies and/or liquids is largely prevented and sound transmission is allowed, and in which a sound absorption layer is formed on the cover layer facing away from the sound. It is described that such a configuration can provide a sandwich element having a high mechanical loading properties, a low weight, and excellent sound absorption properties.

REFERENCE DOCUMENT LIST

Patent Document

Patent Document 1: JP 2009-538746 A

SUMMARY OF THE INVENTION

Problem to be Solved by the Invention

The sandwich element described in the patent document is intended to facilitate sound absorption, at the sound absorbing layer, of noise incident from the direction of the core structure, and is not intended to exhibit sound insulation performance. For conventional sound-insulation material for a vehicle, materials such as expanded polystyrene (styrene foam), and urethane foam are used. Although the materials each have a low weight, they have a problem in that they are so soft that they lack rigidity.

Therefore, an object of the present invention is to provide a sound-insulation material for a vehicle having high rigidity and capable of exhibiting sufficient sound insulation performance against noise having a frequency of 500 Hz to 5000 Hz generated in a vehicle, while maintaining a low weight of the sound-insulation material for a vehicle.

Means for Solving the Problem

To achieve the object, the present invention provides a sound-insulation material for a vehicle having a multilayer structure, the material including: a hard layer having tubular cells, the tubular cells being arranged in a plurality of rows; and a soft layer provided on one surface of the hard layer, wherein a ratio of a dynamic spring constant Kd to a static spring constant Ks, of a structure having the hard layer and the soft layer, is $0 < Kd/Ks \leq 1.5$.

The tubular cell may have a polygonal tubular shape such as a substantially quadrangular tubular shape or a substantially hexagonal tubular shape, or may have a curved tubular shape such as a substantially circular tubular shape or a substantially elliptical tubular shape. It is preferable that each of the cells in the hard layer have a closed surface at one end and an open end at another end, the open ends of the cells each allow an internal space of the cell to be in communication with an outside, and the open ends of the cells be arranged on both sides of the hard layer such that rows of the open ends of the cells are in every other row. The open end, the one-side closed surface, and the other-side closed surface may have a polygonal shape such as a substantially quadrangular shape or a substantially hexagonal shape, or may have a curved shape such as a substantially circular shape or a substantially elliptical shape, according to the shape of the cell.

The static spring constant Ks of the structure having the hard layer and the soft layer is preferably 20 N/mm or more, and the ratio of the dynamic spring constant Kd to the static spring constant Ks is preferably $0.7 < Kd/Ks \leq 1.5$.

The structure may include a film layer, a fiber layer, or a combination thereof as an additional layer between the hard layer and the soft layer. In that case, the dynamic spring constant Kd and the static spring constant Ks are those of a structure including a film layer, a fiber layer, or a combination thereof between the hard layer and the soft layer. A pitch Pcy between the cells in a direction in which the cells of the hard layer are adjacent to each other in a row is preferably within a range of 4 mm to 10 mm.

When a film layer is provided as an additional layer between the hard layer and the soft layer, the thickness of the film layer may be in a range of 50 μm to 300 μm. The film layer may have a plurality of apertures penetrating the film layer.

When an additional layer is provided between the film layer and the soft layer, a static spring constant Ks of the additional layer is preferably smaller than a static spring constant Ks of the soft layer. In this case, urethane foam may be used as the material of the soft layer, the additional layer may be a fiber layer, and a thickness of the fiber layer may be in a range of 0.3 mm to 10 mm.

Effects of the Invention

As described above, the sound-insulation material for a vehicle according to the present invention includes: a hard layer having tubular cells, the tubular cells being arranged in a plurality of rows; and a soft layer provided on at least one surface of the hard layer, and the ratio of a dynamic spring constant Kd to a static spring constant Ks, of the structure having the hard layer and the soft layer, is 0<Kd/Ks≤1.5. This configuration enables the sound-insulation material for a vehicle to have high rigidity while maintaining a low weight. In addition, noise with a frequency of 500 Hz to 5000 Hz generated from a vehicle is transmitted to the vehicle interior via the vibration of air or via the vibration of an object. The noise transmitted mainly via the vibration of an object is blocked by the structure having the hard layer and the soft layer. Accordingly, the sound-insulation material for a vehicle can exhibit sufficient sound insulation performance against the noise generated in the vehicle. The ratio Kd/Ks of the dynamic spring constant to the static spring constant is called a dynamic magnification factor in the field of anti-vibration materials, and it is generally used as one of the indexes of anti-vibration performance. It is widely known that the hard layer of the present invention has conventionally been used as a core layer in vehicle-sound-absorbing materials and has a function of absorbing noise generated in vehicles. In the present invention, a flexible soft layer is adhered to such a hard core layer (hard layer), in which tubular cells are arranged in a plurality of rows. In addition, the ratio Kd/Ks of the dynamic spring constant to the static spring constant, of the structure having the hard layer and the soft layer, is set to 1.5 or less, which is a significantly lower value than the conventional vehicle-sound-absorbing materials each using a core layer. This configuration blocks the noise transmitted mainly via the vibration of an object. Accordingly, the sound-insulation material for a vehicle can exhibit sufficient sound insulation performance against the noise generated in the vehicle.

The sound-insulation material for a vehicle is configured such that: each of the cells in the hard layer has a closed surface at one end and an open end at another end; the open ends of the cells each allow an internal space of the cell to be in communication with an outside; and the open ends of the cells are arranged on both sides of the hard layer such that rows of the open ends of the cells are in every other row. This configuration ensures that the closed surface of the cell of the hard layer serves as a surface for adhering the soft layer thereto, and arranges the closed surface of the cell in every other row, enabling the hard layer to improve adhesiveness with the soft layer.

MODE FOR CARRYING OUT THE INVENTION

An embodiment of a sound-insulation material for a vehicle according to the present invention is described below with reference to the accompanying drawings. Note that the drawings are not intended to be drawn to scale unless otherwise specified.

Figure 1:
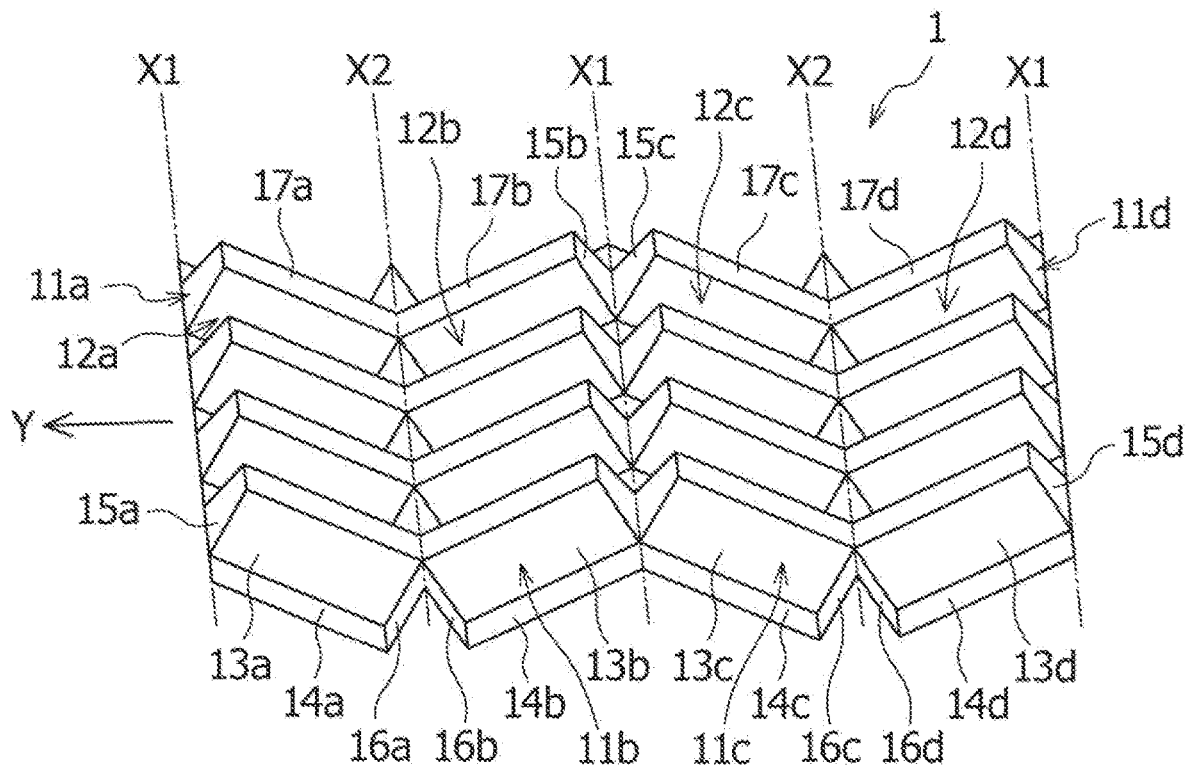
FIG. 1 is a perspective view showing a manufacturing process of a core material used for a hard layer in a sound-insulation material for a vehicle according to the present invention.

First, a hard layer common to each embodiment of the sound-insulation material for a vehicle according to the present invention is described below. FIG. 1 is a perspective view showing a manufacturing process of a core material to be this hard layer (also referred to as a core layer). Note that the manufacturing method of this core material is described in detail in WO 2006/053407 A, which is incorporated herein by reference.

As shown in FIG. 1, a flat material sheet is thermoformed by a roller (not shown) having a predetermined die to be plastically deformed substantially without cutting of the sheet, so that a core material 1 in the figure is formed. The material of the core material 1 to be used can include, for example, a thermoplastic resin such as polypropylene (PP), polyethylene (PE), polyethylene terephthalate (PET), a composite material with fibers, paper, and metal, but it is not limited to these. In particular, a thermoplastic resin is preferable. In this embodiment, a case in which a thermoplastic resin is used is described below. The thickness of the material sheet is preferably in the range of 0.05 mm to 0.50 mm, for example, but it is not limited to this, and the thickness of the core material 1 after thermoforming is substantially the same.

The core material 1 has a three-dimensional structure in which ridge portions 11 and valley portions 12 are alternately arranged in a width direction X orthogonal to a manufacturing direction Y. The ridge portion 11 is configured with two side surfaces 13 and a top surface 17 between them, and the valley portion 12 is configured with two side surfaces 13 shared with the adjacent ridge portions 11 and a bottom surface 14 between them. Note that, in this embodiment, a case is described in which the shape of the ridge portion 11 is a trapezoid as shown in FIG. 1, but the present invention is not limited to this, and in addition to polygons such as triangles or rectangles, shapes may be curved shapes such as sine curves or bow shapes.

The core material 1 includes the three-dimensional structure continuously in the manufacturing direction Y. That is, as shown in FIG. 1, a plurality of ridge portions 11*a*, 11*b*, 11*c*, and 11*d* are continuously formed in the manufacturing direction Y. The valley portions 12 are also formed continuously. The connection between the ridge portions 11 and the connection between the valley portions 12 are made by alternately repeating two types of connection methods.

The first connection method is such that, as shown in FIG. 1, on a first folding line X1 in the width direction, top surfaces 17*b* and 17*c* of two adjacent ridge portions 11*b* and 11*c* are connected, via trapezoidal-shaped ridge portion connecting surfaces 15*b* and 15*c*, respectively. A ridge portion connecting surface 15 is formed at a right angle to the top surface 17. On the first folding line X1 in the width direction, bottom surfaces 14*b* and 14*c* of two adjacent valley portions are directly connected. The second connection method is such that, as shown in FIG. 1, on a second folding line X2 in the width direction, bottom surfaces 14*a* and 14*b* (or 14*c* and 14*d*) of two adjacent valley portions are connected, via trapezoidal-shaped valley portion connecting surfaces 16*a* and 16*b* (or 16*c* and 16*d*), respectively. A valley portion connecting surface 16 is formed at a right angle to the bottom surface 14. On the second folding line X2 in the width direction, top surfaces 12*a* and 12*b* (or 12*c* and 12*d*) of two adjacent ridge portions are directly connected.

Thus, the core material 1 has a plurality of three-dimensional structures (the ridge portions 11 and the valley portions 12) connected via the connection regions (the ridge portion connecting surfaces 15 and the valley portion connecting surfaces 16), and has the connection region folded to form the hard layer of the sound-insulation material for a vehicle of the present invention. Specifically, the core material 1 is mountain-folded along the first folding line X1 such that the bottom surfaces 14*b* and 14*c* of two adjacent valley portions contact back-to-back with each other, and the angle formed by the ridge portion connecting surfaces 15*b* and 15*c* of two adjacent ridge portions increases to 180 degrees. In addition, the core material 1 is valley-folded along the second folding line X2 such that top surfaces 17*a* and 17*b* (or 17*c* and 17*d*) of two adjacent ridge portions contact face to face with each other, and the angle between the valley portion connecting surfaces 16*a* and 16*b* (or 16*c* and 16*d*) of two adjacent valley portions decreases to 180 degrees. A hard layer 10 of the sound-insulation material for a vehicle of the present invention obtained by folding the core material 1 in this manner is shown in FIGS. 2 and 3.

Figure 2:
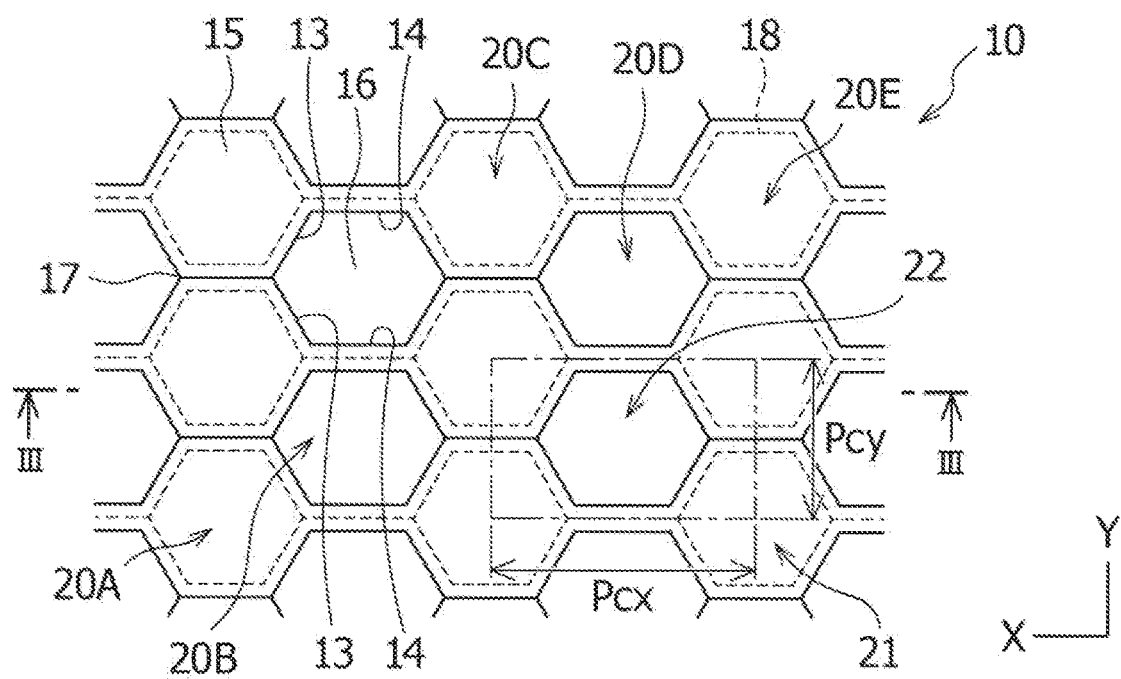
FIG. 2 is a schematic plan view showing a hard layer in a sound-insulation material for a vehicle according to the present invention.
Figure 3:
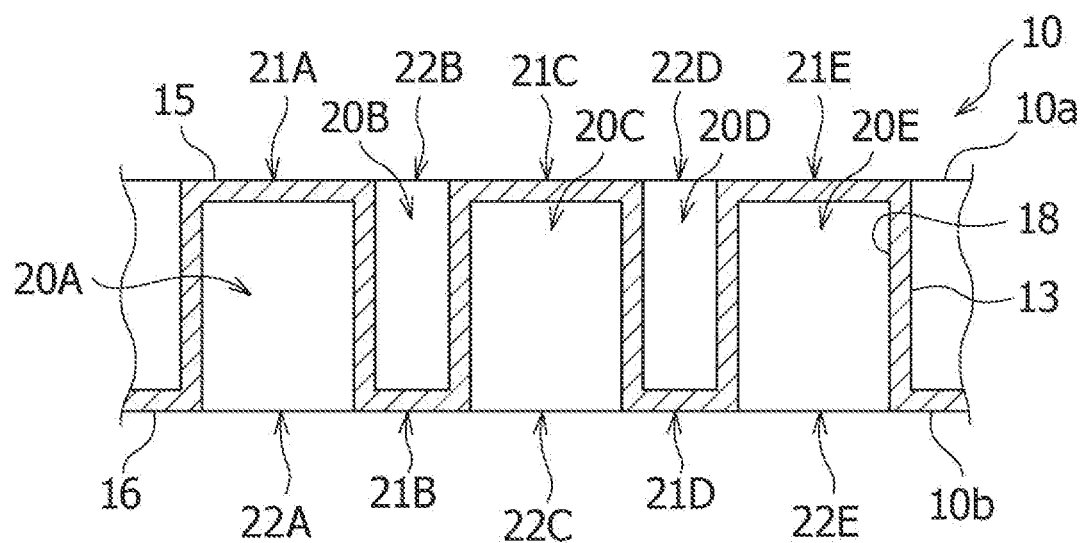
FIG. 3 is a schematic cross-sectional view showing the hard layer of FIG. 2 along line III-III.

As shown in FIGS. 2 and 3, the hard layer 10 includes substantially hexagonal tubular cells 20 arranged in a plurality of rows, and has cells 20A, 20C and 20E formed out of two adjacent ridge portions and cells 20B and 20D formed out of two adjacent valley portions, each arranged in every other row. A broken line 18 in FIG. 3 is the surface that has been the back surface of the core material, and generally indicates the inner wall of the cell 20 having the substantially hexagonal tubular shape.

The cells 20A, 20C, and 20E formed from the ridge portions each include six cell side walls forming the substantially hexagonal tubular shape. These cell side walls are formed out of the two top surfaces 17 and the four side surfaces 13 of the cell material. Furthermore, these cells 20A, 20C, and 20E include substantially hexagonal tubular-shaped closed surfaces 21A, 21C, and 21E, respectively, to close the cell ends at the cell ends on one surface 10*a* (front surface in FIG. 2) of the hard layer 10. Each of these closed surfaces 21 on one side is formed out of two trapezoidal ridge portion connecting surfaces 15 in the cell material. Furthermore, these cells 20A, 20C, and 20E include open ends 22A, 22C, and 22E that are opened in a substantially hexagonal shape at the cell ends on the other surface 10*b* which is at the opposite side of the hard layer 10. The open ends 22A, 22C, and 22E allow the respective internal spaces of the cells 20A, 20C, and 20E to be in communication with the outside.

The cells 20B and 20D formed from the valley portions each also includes six cell side walls forming the substantially hexagonal tubular shape. These cell side walls are formed from two bottom surfaces 14 and four side surfaces 13 of the cell material. Furthermore, these cells 20B and 20D include open ends 22B and 22D that are opened in the substantially hexagonal shape at the cell ends on the one surface 10*a* of the hard layer 10. The open ends 22B and 22D allow the respective internal spaces of the cells 20B and 20D to be in communication with the outside. Furthermore, these cells 20B and 20D include substantially hexagonal tubular-shaped closed surfaces 21B and 21D that close the cell ends, respectively, at the cell ends on the other surface 10*b*, which is at the opposite side of the hard layer 10. Each of these closed surfaces 21 on the other side is formed out of the two trapezoidal valley portion connecting surfaces 16 in the cell material.

In this way, the hard layer 10 has the one-side closed surfaces 21A, 21C, and 21E formed out of the ridge portions of the cell material in every other row at the cell end on one surface 10*a*, and has the other-side closed surfaces 21B and 21D formed out of valley portions of the cell material in the different cell rows from the above at the cell ends on the other surface 10*b*. However, unless otherwise stated, both the closed surface 21 on one side and the closed surface 21 on the other side perform substantially the same function.

The thickness of the entire hard layer 10 varies depending on which component of the vehicle the multilayered structure is used for, so it is not limited to the following. However, from the viewpoint of controlling the ratio Kd/Ks of the dynamic spring constant to the static spring constant, of the structure having the hard layer and a soft layer to be described below, the sound absorption performance of the hard layer 10 itself, and the strength and weight of the hard layer 10, the thickness is preferably in the range of 3 mm to 50 mm, and more preferably in the range of 5 mm to 30 mm.

The basis weight (weight per unit area) of the hard layer 10 varies depending on which component of the vehicle the multilayered structure is used for, so it is not limited to the following. However, the basis weight is preferably in the range of 400 g/m$^2$ to 4000 g/m$^2$, and more preferably in the range of 500 g/m$^2$ to 3000 g/m$^2$. As the thickness of the hard layer 10 is greater and the basis weight is greater, the strength of the hard layer 10 generally tends to be higher.

The basis weight of the hard layer 10 can be adjusted by the type of material of the hard layer 10, the thickness of the entire hard layer 10, or the wall thickness of the cell 20 (thickness of the material sheet) as well as the pitches Pcx and Pcy between the cells 20 of the hard layer 10 (distance between the central axes of the cells). In order to set the basis weight of the hard layer 10 in the above range, for example, it is preferable that the pitch Pcy between the cells 20 be in the range of 2 mm to 20 mm in the direction in which the cells 20 are adjacent to each other to form a row, which is the core manufacturing direction Y, and it is more preferable that the pitch Pcy be in the range of 3 mm to 15 mm. In particular, in order to control the ratio Kd/Ks of the dynamic spring constant to the static spring constant, to be described below, within a predetermined range, it is still more preferable that the pitch Pcy between the cells 20 be within the range of 4 mm to 10 mm.

Next, individual embodiments of the sound-insulation material for a vehicle according to the present invention are described below using the hard layer 10 described above.

First Embodiment

Figure 4:
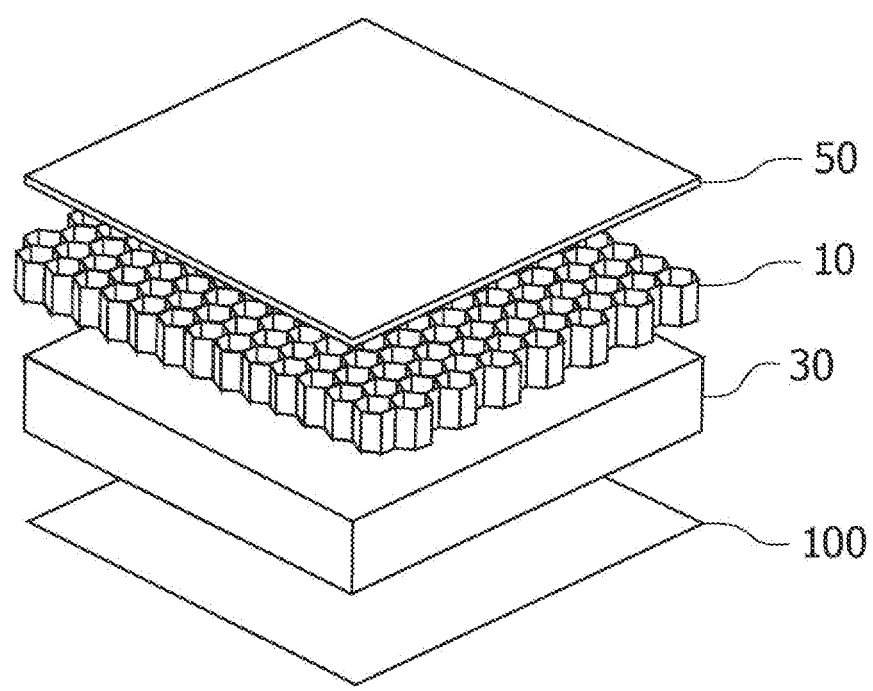
FIG. 4 is an exploded perspective view showing an embodiment of a sound-insulation material for a vehicle according to the present invention.
Figure 5:
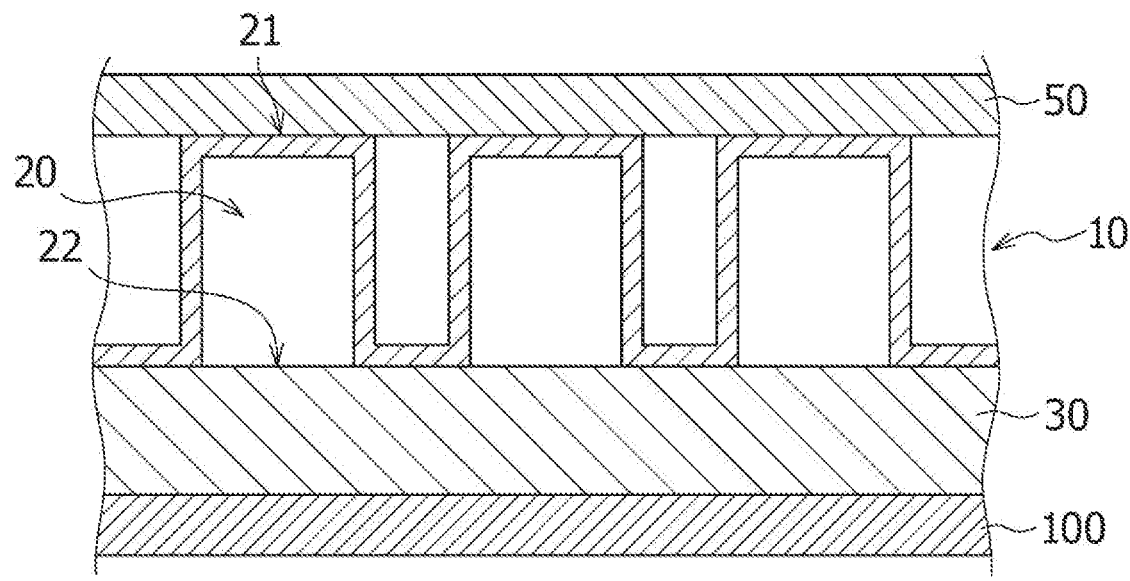
FIG. 5 is a schematic cross-sectional view of an embodiment of the sound-insulation material for a vehicle shown in FIG. 4.

As shown in FIGS. 4 and 5, a sound-insulation material for a vehicle of a first embodiment includes a hard layer 10 described above, a soft layer 30 provided on one surface of the hard layer 10, and a skin layer 50 provided on the other surface of the hard layer 10. Note that the sound-insulation material for a vehicle of the present invention is used so that the soft layer 30 side is located on the side of the noise source. That is, the sound-insulation material for a vehicle of the present invention is provided on the vehicle interior side, with the soft layer 30 installed on a panel 100 side of the vehicle body.

Since the soft layer 30 is softer than the hard layer 10 (also referred to as a core layer), which has a hard nature with tubular cells arranged in a plurality of rows, it is referred to as a soft layer in this specification. The material of the soft layer 30 is not particularly limited if it is a material generally used for a sound insulation layer in sound-insulation material for a vehicle. However, from the viewpoint of weight reduction of the sound-insulation material for a vehicle, the material is preferably a foam of a thermoplastic resin, thermosetting resin or the like, such as urethane foam, polyethylene foam, or nylon foam. The material is also preferably fiber such as: synthetic fiber such as polyester fiber, nylon fiber or acrylic fiber; inorganic fiber such as glass wool or rock wool; and metal fiber such as aluminum fiber. The fiber is preferably felt, and the felt is preferably formed of a polyester fiber such as a low melting point polyester fiber or a material such as glass wool. In addition, the felt manufacturing method is preferably a manufacturing method such as needle punching, thermal bonding, or spunlacing. Note that the soft layer 30 may be a combination of foam and fiber.

The basis weight of the soft layer 30 is not limited to the following since it depends on the ratio Kd/Ks of a dynamic spring constant to a static spring constant to be described below, but for example, the lower limit thereof is preferably 200 g/m$^2$ or more, and more preferably 300 g/m$^2$ or more, and still more preferably 500 g/m$^2$ or more. In addition, the upper limit of the basis weight is preferably 2000 g/m$^2$ or less, more preferably 1500 g/m$^2$ or less, and still more preferably 1200 g/m$^2$ or less.

The thickness of the soft layer 30 is not limited to the following since it depends on the ratio Kd/Ks of a dynamic spring constant to a static spring constant to be described below, but for example, the lower limit thereof is preferably 4 mm or more, more preferably 7 mm or more, and still more preferably 10 mm or more. In addition, the upper limit of the thickness is preferably 50 mm or less, more preferably 40 mm or less, and still more preferably 30 mm or less.

In this embodiment, a structure of the hard layer 10 and the soft layer 30 has a ratio of the dynamic spring constant Kd to the static spring constant Ks satisfying 0<Kd/Ks≤1.5. The ratio Kd/Ks of the dynamic spring constant to the static spring constant is called a dynamic magnification factor in the field of anti-vibration materials and is generally used as one of the indexes of anti-vibration performance. In the present invention, the ratio Kd/Ks of the dynamic spring constant to the static spring constant, of the structure having the hard layer 10 and the soft layer 30, is set to 1.5 or less, which is a significantly lower value than the conventional vehicle-sound-absorbing materials each using a core layer. Noise with a frequency of 500 Hz to 5000 Hz generated from a vehicle is transmitted to the vehicle interior via the vibration of air or via the vibration of an object. The noise transmitted mainly via the vibration of the object can be blocked by the structure having the hard layer 10 and the soft layer 30. This makes it possible to exhibit sufficient sound insulation performance against the noise generated in the vehicle. The ratio Kd/Ks of the dynamic spring constant to the static spring constant is more preferably 1.4 or less, and still more preferably 1.0 or less. On the other hand, a too low ratio Kd/Ks of the dynamic spring constant to the static spring constant causes vibration at a low frequency, and is unsuitable for a soundproofing material for vehicles. Therefore, the lower limit of the ratio Kd/Ks needs to exceed 0, and it is preferably 0.5 or more and more preferably 0.7 or more.

In particular, when the ratio Kd/Ks of the dynamic spring constant to the static spring constant is 0.7 or more, in order to maintain the shape, the static spring constant Ks, of the structure having the hard layer 20 and the soft layer 30, is preferably 20 N/mm or more, and more preferably 25 N/mm or more. The upper limit of the static spring constant Ks of the structure is not particularly limited, but it is preferably 50 N/mm or less, and more preferably 30 N/mm or less. In addition, the dynamic spring constant Kd of the structure is not particularly limited, but the lower limit thereof is preferably 2 N/mm or more, and more preferably 10 N/mm or more, and the upper limit thereof is preferably 80 N/mm or less, and more preferably 50 N/mm or less.

Figure 6A:
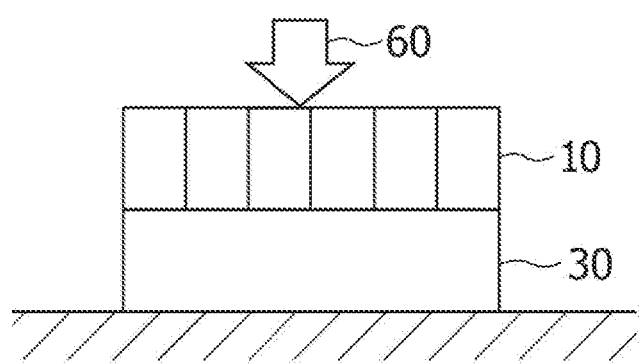
FIG. 6A is a schematic diagram illustrating a method for measuring a static spring constant of a sound-insulation material for a vehicle according to the present invention.
Figure 6B:
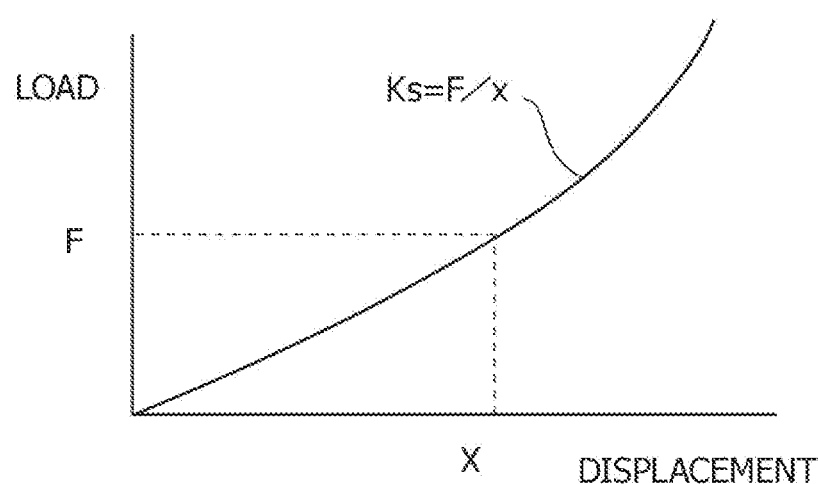
FIG. 6B is a graph for determining a static spring constant from measured values.
Figure 7A:
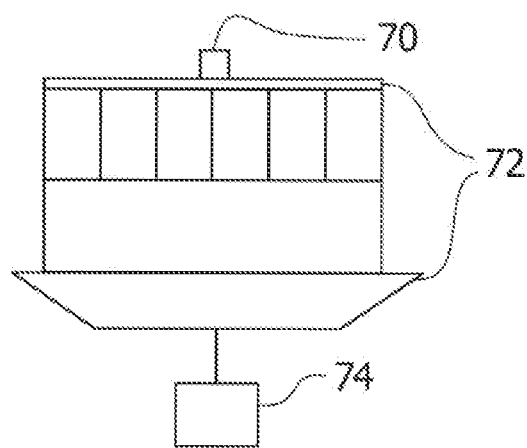
FIG. 7A is a schematic diagram illustrating a method for measuring a dynamic spring constant of a sound-insulation material for a vehicle according to the present invention.
Figure 7B:
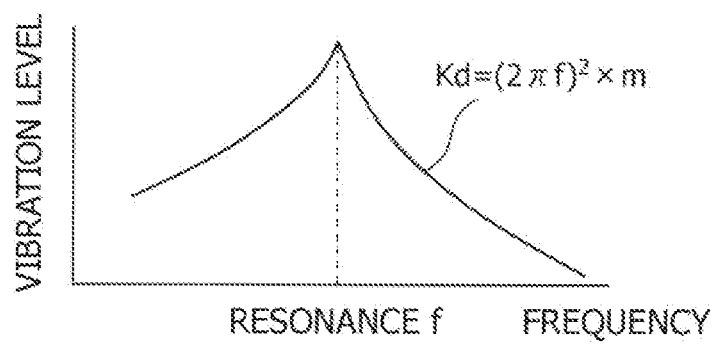
FIG. 7B is a graph for determining a dynamic spring constant from a measured value.
Figure 8:
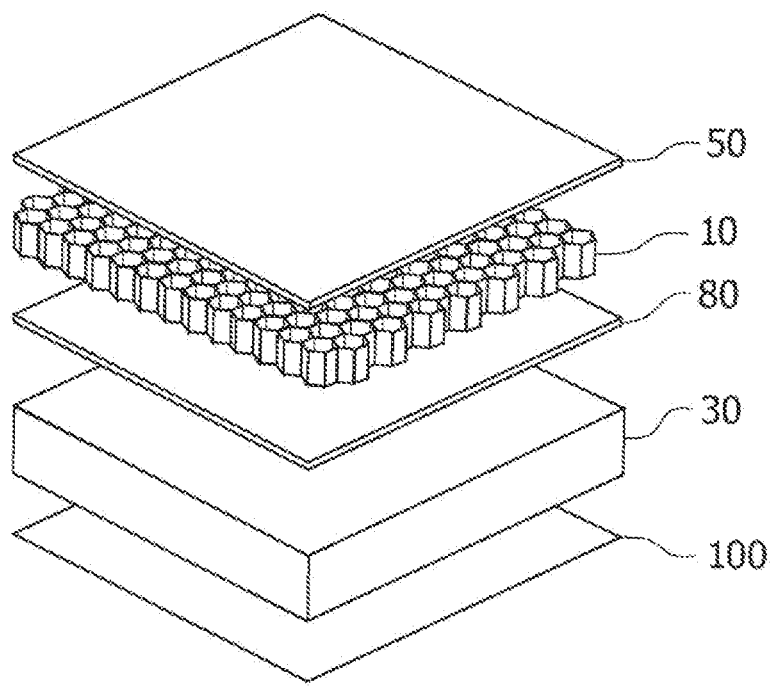
FIG. 8 is an exploded perspective view showing another embodiment of a sound-insulation material for a vehicle according to the present invention.

The ratio Kd/Ks of the dynamic spring constant to the static spring constant, of the structure having the hard layer 10 and the soft layer 30, can be determined by the following method. First, each of the static spring constant Ks and the dynamic spring constant Kd, of the structure having the hard layer 10 and the soft layer 30, is measured conforming to JIS K 6385 and JIS K 6394. Specifically, the static spring constant Ks (N/mm) is measured as follows: as shown in FIG. 6A, a sample of the structure having the hard layer 10 and the soft layer 30 is compressed in a compression direction 60 with a load F (N) using a compression device (not shown); the displacement x (mm) of the thickness of the sample is measured at that time; as shown in FIG. 6B, a graph of displacement with respect to load (Ks=F/x) is created; and the static spring constant Ks is calculated from the slope of the linear region on this graph. The dynamic spring constant Kd (N/mm) is measured as follows: as shown in FIG. 7A, a sample of the structure having the hard layer 10 and the soft layer 30 is sandwiched between mass plates 72 to have a predetermined mass m; the hard layer 10 side of this sample is placed on an accelerometer 70; a vibration exciter 74 is placed on the soft layer 30 side; the vibration level is measured when the sample is vibrated over frequencies of 10 Hz to 400 Hz with an acceleration amplitude of 0.1 m/s$^2$; as shown in FIG. 7B, a graph of vibration level with respect to frequency is created; and the resonance frequency f is determined, and the dynamic spring constant Kd is calculated from the expression Kd=(2πf)$^2$×m. Then, the ratio (Kd/Ks) is calculated using the static spring constant Ks and the dynamic spring constant Kd, which are thus calculated. The static spring constant Ks can be measured by, for example, a commercially available tensile-compression tester (AG-20kNX, manufactured by Shimadzu Corporation). The dynamic spring constant Kd can be measured by, for example, a combination of a commercially available electromagnetic vibration exciter (VG-100, manufactured by AR BROWN Co., Ltd.) and a vibration measuring device (Test.Lab, manufactured by LMS International).

The static spring constant Ks and the dynamic spring constant Kd differ depending on the configuration of the soft layer 30 (for example, the type of material, basis weight, thickness, and the like), and the constants are also affected by the configuration of the hard layer 10 to which the soft layer 30 is provided (for example, the material, the arrangement of cells, the thickness of the entire hard layer, the pitch of cells, the thickness of the cell wall surface, and the like). The static spring constant Ks of the soft layer 30 is not particularly limited, but the lower limit thereof is preferably 20 N/mm or more, and more preferably 25 N/mm or more, and the upper limit thereof is preferably 80 N/mm or less, and more preferably 50 N/mm or less.

The skin layer 50 is a layer that is to be a surface on the vehicle interior side when the sound-insulation material for a vehicle of this embodiment is installed on the panel 100 of the vehicle body. The skin layer 50 may be a carpet or urethane foam that is generally used as a skin layer for a sound-insulation material for a vehicle or a vehicle-sound-absorbing material. As a main material of the carpet material, for example, polyester fiber, natural fiber or the like can be used. A method used for producing the carpet can be, for example, a needle punching or the like. The surface density of the carpet is preferably in the range of 800 to 2000 g/m$^2$.

According to the first embodiment, the soft layer 30 is provided on one surface of the hard layer 10 on which the open ends and the closed surfaces are arranged in every other row; the skin layer 50 is provided on the other surface of the hard layer 10; and the ratio Kd/Ks of the dynamic spring constant to the static spring constant described above is made within the above numerical range. This configuration can increase rigidity while maintaining a low weight of the sound-insulation material for a vehicle. In addition, with respect to the noise having a frequency of 500 Hz to 5000 Hz generated in a vehicle, this configuration can block the noise transmitted mainly via the vibration of an object to exhibit sufficient sound insulation performance.

Second Embodiment

Figure 9:
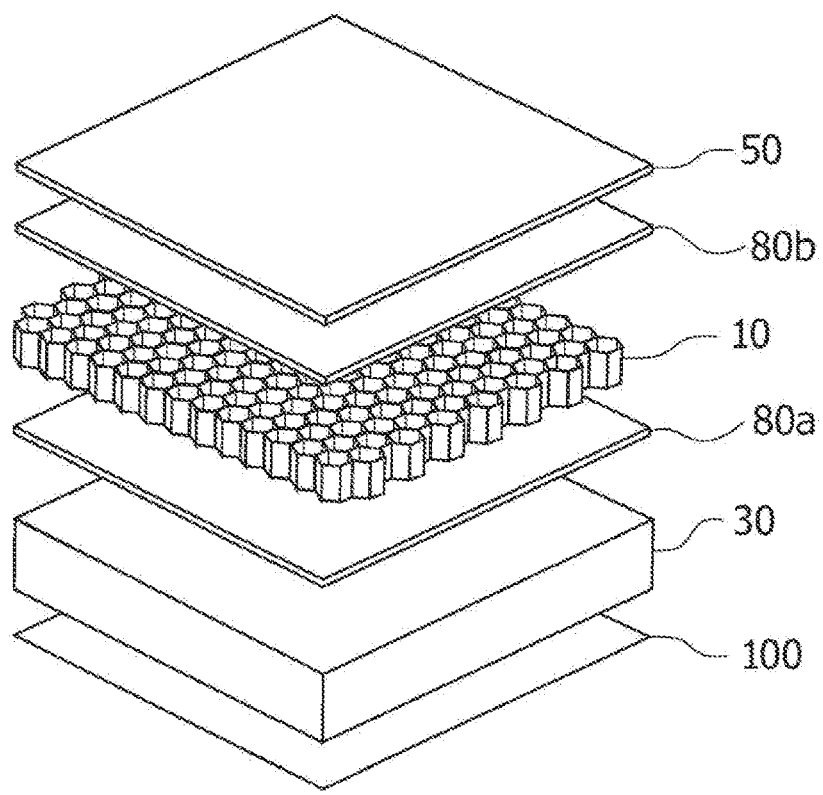
FIG. 9 is an exploded perspective view showing still another embodiment of a sound-insulation material for a vehicle according to the present invention.

As shown in FIG. 9, a sound-insulation material for a vehicle of a second embodiment includes the hard layer 10 mentioned above, a soft layer 30 provided on one surface of the hard layer 10 via a film layer 80 as an additional layer, and a skin layer 50 provided on another surface of the hard layer 10. Note that the same configurations as those in the first embodiment are referred to by the same reference signs, and detailed descriptions thereof are omitted here.

In the second embodiment, the film layer 80 is provided between the hard layer 10 and the soft layer 30. In this case, a dynamic spring constant Kd and a static spring constant Ks are obtained by carrying out the measurement method mentioned above on the structure having the hard layer 10 and the soft layer 30 with the film layer 80 therebetween. From these spring constants, the ratio Kd/Ks of the dynamic spring constant to the static spring constant, of the structure having the hard layer 10 and the soft layer 30, is calculated. If the ratio Kd/Ks of the dynamic spring constant to the static spring constant calculated in this way is within the predetermined numerical range described above, the same sound insulation effect as that of the first embodiment can be obtained.

The material of the film layer 80 to be used may be, for example, resin films such as polypropylene (PP), polyethylene (PE), polyethylene terephthalate (PET), and polyamide (PA), but it is not limited to these.

The thickness of the film layer 80 is not particularly limited if the ratio Kd/Ks of the dynamic spring constant to the static spring constant, of the structure having the hard layer 10 and the soft layer 30 described above, is maintained within a predetermined range. However, for example, the lower limit of the thickness is preferably 0.03 mm or more, more preferably 0.04 mm or more, and still more preferably 0.05 mm or more. In addition, the upper limit of the thickness is preferably 0.5 mm or less, more preferably 0.4 mm or less, and still more preferably 0.3 mm or less.

The film layer 80 may be heat-welded to be adhered to the hard layer 10 and the soft layer 30, or may be adhered thereto via an adhesive (not shown). The adhesive to be used is not particularly limited, but for example, it may be an epoxy-based or acrylic-based adhesive. In addition, in order to heat-weld the skin layer 50 with the hard layer 10 and the soft layer 30, for example, the skin layer 50 may have a three-layer structure including a central layer and two adhesive layers located on both side surfaces thereof. In this case, the material of the adhesive layer is a material having a melting point lower than the melting point of the material used for the central layer. For example, a polyamide having a melting point of 190° C. to 220° C. is used for the central layer, and polyethylene having a melting point of 90° C. to 130° C. is used for the adhesive layer. Then, the temperature at the time of heating when the skin layer 50 is adhered to the hard layer 10 and the soft layer 30, and the temperature for thermoforming into a predetermined shape of the sound-insulation material for a vehicle are set to about 150° C. to 160° C. This configuration and process can melt only the adhesive layer without melting the central layer to enable the central layer to firmly adhere to the hard layer 10 and the soft layer 30. A resin having a melting point higher than that of polyethylene for the adhesive layer may be a polypropylene as well as a polyamide.

The film layer 80 may be breathable with a plurality of apertures penetrating the film layer, or may be non-breathable without such apertures. When there are apertures, the holes are provided in advance before the film layer 80 is adhered to the hard layer 10, for example, by a hot needle or punching (punching using a male die and a female die). In order to prevent the holes from being closed, it is preferable to have a hole shape in which burrs of the holes are minimized. The aperture pattern does not have any particular limitation, but it is preferably arranged in a staggered arrangement or a lattice arrangement. The aperture rate of the film layer 80 is not particularly limited, but it is preferably in the range of 0.2% to 5%. The diameter of the aperture is preferably in the range of 0.25 mm to 2.5 mm, and more preferably in the range of 0.3 mm to 2.0 mm Note that the pitch of the apertures of the film layer 80 does not necessarily need to be the same as the pitches Pcx and Pcy of cells 20 of the hard layer 10 shown in FIG. 2, and the apertures and the cells 20 do not necessarily need to be aligned when the film layer 80 is adhered to the hard layer 10. This is because the positions of the apertures of the film layer 80 and open ends 22 of the cells 20 of the hard layer 10 randomly overlap each other to allow appropriate communication between the inside and outside. It is preferable that the pitch of the apertures of the film layer 80 be smaller than the pitch of the cells 20 of the hard layer 10 at least in either an X direction or a Y direction.

According to the second embodiment, a film layer 80 is provided between the hard layer 10, on which the open ends and the closed surfaces are arranged in every other row, and the soft layer 30. This makes it possible to obtain the same effect as that of the first embodiment, and the effect that the film layer 80 can absorb or insulate sound. In particular, providing a plurality of apertures in the film layer 80 enables sound absorption.

Third Embodiment

As shown in FIG. 9, a sound-insulation material for a vehicle of a third embodiment includes the hard layer 10 mentioned above, a soft layer 30 provided on one surface of the hard layer 10 via a first film layer 80a, and a skin layer 50 provided on another surface of the hard layer 10 via a second film layer 80b. Note that the same configurations as those in the first and second embodiments are referred to by the same reference signs, and detailed descriptions thereof are omitted here.

The first and second film layers 80a and 80b to be used can have the same configuration (material, thickness, layer structure, existence or absence of apertures, and the like) as the film layer 80 described in the second embodiment. The first and second film layers 80a and 80b to be used may have the same configuration or may have different configurations. Also, in the third embodiment, as in the second embodiment, a dynamic spring constant Kd and a static spring constant Ks are obtained by carrying out the measurement method mentioned above on the structure having the hard layer 10 and the soft layer 30 with the first film layer 80a therebetween. From these spring constants, the ratio Kd/Ks of the dynamic spring constant to the static spring constant, of the structure having the hard layer 10 and the soft layer 30, is calculated.

According to the third embodiment, the same effect as that of the second embodiment can be obtained. In addition, the second film layer 80b is provided between the skin layer 50 and the hard layer 10 on which the open ends and the closed surfaces are arranged in every other row. This makes it possible to obtain the effect that the second film layer 80b also can absorb or insulate sound.

Fourth Embodiment

Figure 10:
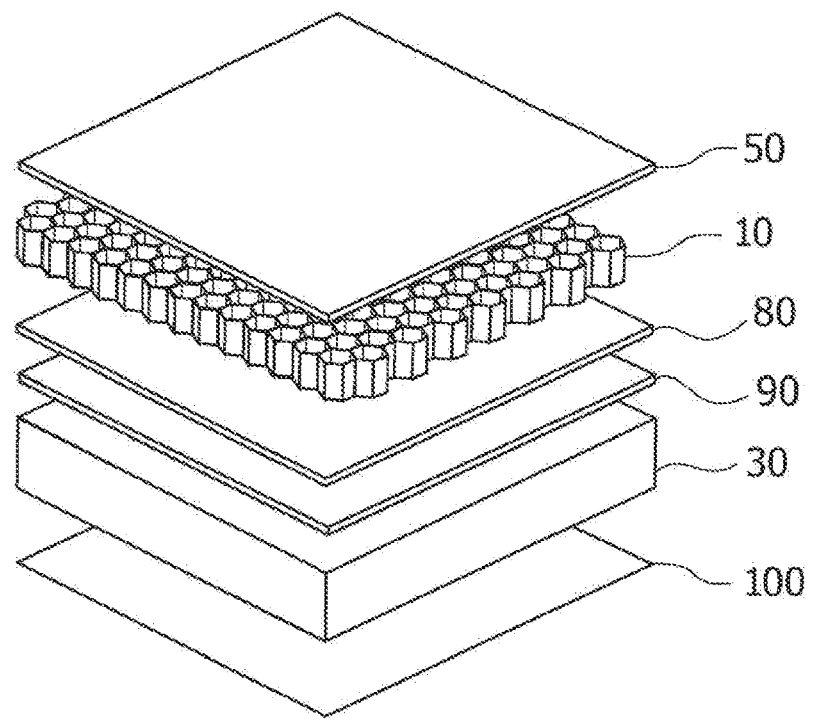
FIG. 10 is an exploded perspective view showing still another embodiment of a sound-insulation material for a vehicle according to the present invention.

As shown in FIG. 10, a sound-insulation material for a vehicle of a fourth embodiment includes the hard layer 10 mentioned above, a soft layer 30 provided on one surface of the hard layer 10 with a film layer 80 and a fiber layer 90 in order therebetween as additional layers, and a skin layer 50 provided on another surface of the hard layer 10. Note that the same configurations as those in the first and second embodiments are referred to by the same reference signs, and detailed descriptions thereof are omitted here.

In the fourth embodiment, the film layer 80 and the fiber layer 90 are provided between the hard layer 10 and the soft layer 30. In this case, a dynamic spring constant Kd and a static spring constant Ks can be obtained by carrying out the measurement method mentioned above on the structure having the hard layer 10 and the soft layer 30 with the film layer 80 and the fiber layer 90 therebetween. From these spring constants, the ratio Kd/Ks of the dynamic spring constant to the static spring constant, of the structure having the hard layer 10 and the soft layer 30 described above, is calculated. If the ratio Kd/Ks of the dynamic spring constant to the static spring constant calculated in this way is within the predetermined numerical range described above, the same sound insulation effect as that of the first embodiment can be obtained.

The fiber layer 90 is not particularly limited if it maintains the ratio Kd/Ks of the dynamic spring constant to the static spring constant described above within a predetermined range. Hoverer, it is preferable to use, for example, various nonwoven fabrics such as spunbonded, spunlaced, or needle punched nonwoven fabrics using resin fibers such as polyethylene terephthalate (PET), polypropylene (PP), or polyethylene (PE). The basis weight of the fiber layer 90 is not particularly limited if the ratio Kd/Ks of the dynamic spring constant to the static spring constant described above is maintained within a predetermined range. However, for example, the basis weight is preferably in the range of 10 $g/m^2$ to 600 $g/m^2$, more preferably in the range of 20 $g/m^2$ to 500 $g/m^2$, and still more preferably in the range of 30 $g/m^2$ to 300 $g/m^2$.

In particular, the static spring constant Ks of the laminated body of the film layer 80 and the fiber layer 90, which are the additional layers, is preferably smaller than the static spring constant Ks of the soft layer 30 in order to make it difficult to transmit vibration. For example, the static spring constant Ks of the laminated body, which is the additional layer, is not particularly limited, but the lower limit thereof is preferably 0.1 N/mm or more, and more preferably 0.5 N/mm or more, and the upper limit of thereof is preferably 30 N/mm or less, and more preferably 20 N/mm or less.

Note that, although FIG. 10 shows a laminated body of the film layer 80 and the fiber layer 90, as the additional layer, the additional layer may be only the fiber layer 90. In this case, the static spring constant Ks of the fiber layer 90 is preferably smaller than the static spring constant Ks of the soft layer 30. For example, the static spring constant Ks of the fiber layer 90 is not particularly limited, but the lower limit thereof is preferably 0.1 N/mm or more, and more preferably 0.5 N/mm or more, and the upper limit thereof is preferably 30 N/mm or less, and more preferably 20 N/mm or less. The material of the soft layer 30 to be used in this case may be urethane foam. In addition, in order to make it difficult to transmit vibration, the lower limit in the thickness of the fiber layer 90 in this case is preferably 0.3 mm or more, and more preferably 1 mm or more, and the upper limit in the thickness is preferably 10 mm or less, and more preferably 5 mm or less.

According to the fourth embodiment, the film layer 80 and the fiber layer 90 are provided between the soft layer 30 and the hard layer 10 on which the open ends and the closed surfaces are arranged in every other row. This makes it possible to obtain the same effect as that of the first embodiment, and also to obtain the effect that the film layer 80 and the fiber layer 90, which are the additional layers, can absorb sound. In addition, when the additional layer is only the fiber layer 90, the effect of further weight reduction can be obtained.

EXAMPLES

Examples and comparative examples of the present invention are described below.

As Example 1, a sound-insulation material for a vehicle having a multilayer structure shown in FIG. 10 was produced. First, on one surface of a hard layer having the structures of FIGS. 1 to 3 (material: polypropylene (PP) resin, pitch Pcy between cells: 8 mm, thickness of hard layer: 10 mm), a film layer (material: apertured polypropylene (PP) film, thickness: 50 μm), a fiber layer (material: PP needle punched nonwoven fabric, basis weight: 15 g/m$^2$), and a soft layer (material: polyurethane foam (PU), basis weight: 1000 g/m$^2$, thickness: 10 mm) were adhered in order. Then, the static spring constant Ks of the structure having the hard layer, the film layer, the fiber layer and the soft layer was measured by a tensile-compression tester (Ag-20kNX, manufactured by Shimadzu Corporation), in which the compression terminal speed was 50 mm/min, and the compression rate was up to 20%. Subsequently, a dynamic spring constant Kd was measured with a combination of an electromagnetic vibration exciter (VG-100, manufactured by AR BROWN Co., Ltd.) and a vibration measuring device (Test.Lab, manufactured by LMS International), in which the frequencies were 10 to 400 Hz, the acceleration amplitude was 0.1 m/s$^2$, and the mass m was 0.0232 kg. The results are shown in Table 1. As shown in Table 1, the static spring constant Ks was 27.5 N/mm, and the dynamic spring constant Kd was 27.7 N/mm Therefore, the ratio Kd/Ks of the dynamic spring constant to the static spring constant was 1.0. In addition, the static spring constant Ks of each of the fiber layer and the soft layer was measured in the same procedure as the above. The results are shown in Table 1. The static spring constant Ks of the film layer was not measured here because the effect was so small that it was ignorable.

Figure 11:
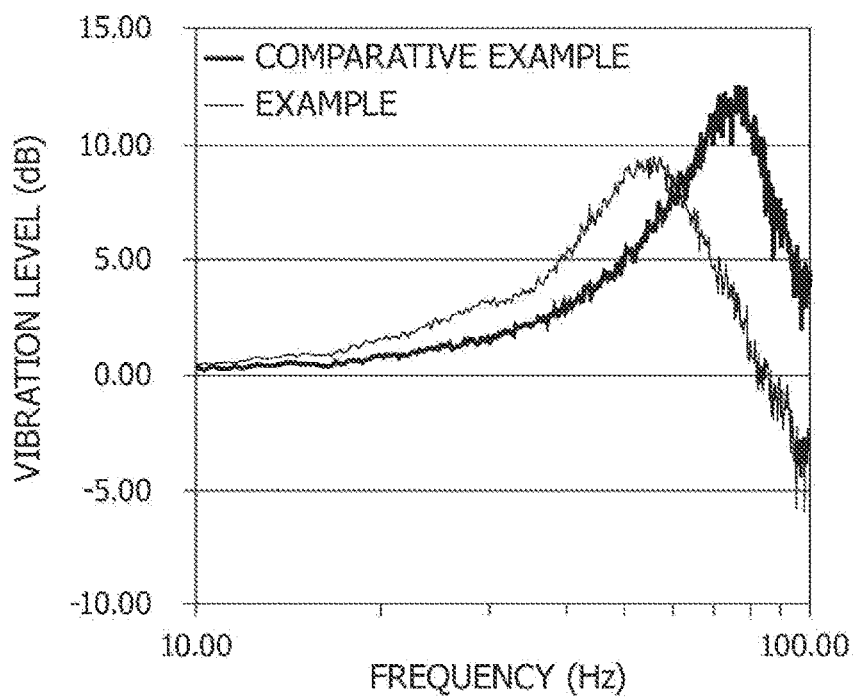
FIG. 11 is a graph showing measurement results of dynamic spring constants in Example 1 and Comparative Example 1 of a sound-insulation material for a vehicle according to the present invention.

Here, a graph of the results obtained by measuring the dynamic spring constant Kd is shown in FIG. 11. As shown in FIG. 11, since the resonance frequency f was 56.75 Hz in Example 1, the value of Kd can be determined by substituting this measurement result and 0.0232 kg (0.23 N) of mass m into the expression of Kd=$(2\pi f)^2 \times m$.

Next, insertion loss was measured for the four-layer structure of the hard layer, the film layer, the fiber layer, and the soft layer of Example 1. Insertion loss is an index showing the sound insulation performance improved by attaching a sound-insulation material to a base such as a panel. Specifically, the insertion loss (ILt$_{trim}$) of the structure serving as the sound-insulation material can be derived by the expression IL$_{trim}$=TL$_{panel-trim}$−TL$_{panel}$, where: TL$_{panel}$ is as a sound transmission loss in a state of a panel of a vehicle alone as the be; and TL$_{panel-trim}$ is a sound transmission loss in a state in which the structure and the skin layer serving as a sound-insulation material are attached to the panel.

Figure 12:
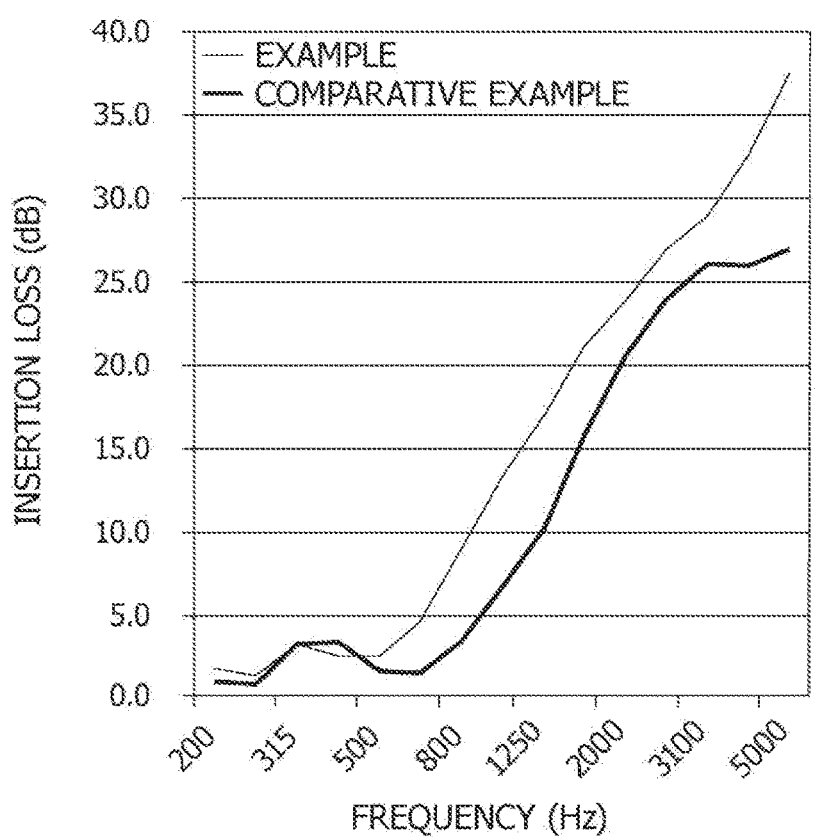
FIG. 12 is a graph showing a relationship between frequency and insertion loss in Example 1 and Comparative Example 1 of a sound-insulation material for a vehicle according to the present invention.

The sound transmission loss between the frequencies of 200 Hz and 5000 Hz was measured for each of the state with the base and the state with the structure attached, and the insertion loss was determined from these measurement results based on the above expression. The result is shown in FIG. 12. Here, the sound transmission loss was measured by measuring sound intensity in combination with the reverberation chamber and the anechoic chamber. The relationship between the sound transmission loss and each measured value is shown in the following expression. The size of each measurement sample was 500 mm×600 mm.

$$TL=SPL_0-PWL_i+10 \log_{10}S-6$$

where: TL is the sound transmission loss (dB);

SPL$_0$ is the average sound pressure level in reverberation room (dB);

PWL$_i$ is the power level of transmitted sound (dB); and

S is the sample area (m$^2$).

Here, for comparison, Comparative Example 1 was produced in the same manner as in Example 1 except that expanded polystyrene (EPS) (thickness: 10 mm) was used instead of the hard layer, and the film layer and fiber layer were omitted. In Comparative Example 1, the static spring constant Ks and the dynamic spring constant Kd were measured in the same manner as in Example 1. The results are shown in Table 1 and FIG. 11. Also, in Comparative Example 1, the insertion loss was measured in the same manner as in Example 1. The result is shown in FIG. 12.

As shown in FIG. 11, in Comparative Example 1, because the resonance frequency f was 76.5 Hz, the dynamic spring constant Kd was 52.6 N/mm, which was much higher than that of Example 1. The static spring constant Ks was 25 N/mm, which was relatively close to that of Example 1, but the ratio Kd/Ks of the dynamic spring constant to the static spring constant was as high a value as 2.1. Then, as shown in FIG. 12, it was confirmed that: Example 1, whose ratio Kd/Ks of the dynamic spring constant to the static spring constant was 1.0, had insertion losses that were about 3 dB or more higher than that of Comparative Example 1, of which the ratio Kd/Ks of the dynamic spring constant to the static spring constant was 2.1 over frequencies between 500 and 5000 Hz, and exhibited excellent sound insulation performance. In addition, Comparative Example 1 has the structure with foamed polyurethane and expanded polystyrene, both of which are soft, and the sound-insulation material as a whole lacked rigidity. On the other hand, the hard layer used in Example 1 is a hard and light core layer, in which tubular cells are arranged in a plurality of rows, instead of styrene foam in Comparative Example. Therefore, the sound-insulation material as a whole can have high rigidity while maintaining low weight.

As Examples 2 to 6, as shown in Table 1, structures serving as sound-insulation materials were produced in the same manner as in Example 1, except that: a hard layer had different pitch Pcy between the cells of the core; a soft layer are made of felt (material: miscellaneous fibers, basis weight: 600 g/m$^2$); and/or some of the hard layers and soft layers therebetween had: no film layer and/or no fiber layer; film layers made of non-breathable films without apertures; film layers with different thicknesses; and/or fiber layers with different basis weight. Then, the static spring constant Ks and the dynamic spring constant Kd of Examples 2 to 6 were measured. In addition, in Comparative Examples 1 and 2, as shown in Table 1, the static spring constant Ks and the dynamic spring constant Kd were measured in the same manner as in Example 1, except that only the soft layers of Examples 1 and 6 were used as the structures. These results are shown in Table 1.

TABLE 1

| | Hard layer | | Film layer | Fiber layer Material | | | Soft layer | | Measurement result of structure | | |
|---|---|---|---|---|---|---|---|---|---|---|---|
| | Material (Pitch) | Thickness [mm] | Material (Thickness) | (Basis weight) | Ks [N/mm] | Material | Thickness [mm] | Ks [N/mm] | Kd [N/mm] | Ks [N/mm] | Kd/Ks |
| Example 1 | PP (8 mm) | 10 | Apertured PP (50 μm) | Non-woven fabric (15 g/m²) | 0.8 | PU Foam | 10 | 30 | 27.7 | 27.5 | 1.0 |
| Example 2 | PP (4 mm) | 10 | — | — | | PU Foam | 10 | 30 | 40.4 | 27.5 | 1.5 |
| Example 3 | PP (8 mm) | 10 | — | — | | PU Foam | 10 | 30 | 40.4 | 27.5 | 1.5 |
| Example 4 | PP (8 mm) | 10 | PP 300 μm | — | | PU Foam | 10 | 30 | 34.6 | 25 | 1.4 |
| Example 5 | PP (8 mm) | 10 | PP (300 μm) | Non-woven fabric (300 g/m²) | 0.8 | PU Foam | 10 | 30 | 14.6 | 20 | 0.7 |
| Example 6 | PP (8 mm) | 10 | PP (300 μm) | — | | Felt | 10 | 0.8 | 2.5 | 5 | 0.5 |
| Example 7 | PP (8 mm) | 10 | — | Non-woven fabric (300 g/m²) | 0.8 | PU Foam | 10 | 30 | 14.2 | 20 | 0.7 |
| Comparative example 1 | EPS | 10 | — | — | | PU Foam | 10 | 30 | 52.6 | 25 | 2.1 |
| Comparative example 2 | None | — | — | — | | PU Foam | 10 | 30 | 72.8 | 30 | 2.4 |
| Comparative example 3 | None | — | — | — | | Felt | 10 | 0.8 | 3.87 | 0.8 | 4.8 |

As shown in Table 1, even Examples 2 and 3, each of which had neither a film layer nor a fiber layer provided between the hard layer and the soft layer, achieved ratios Kd/Ks of the dynamic spring constant to the static spring constant of 1.5 or less. In addition, Examples 4 to 6, each of which had a different film layer, fiber layer, and/or soft layer, also achieved ratios Kd/Ks of the dynamic spring constant to the static spring constant of 1.5 or less. On the other hand, Comparative Example 2 which had only urethane foam had a dynamic spring constant Kd further higher than Comparative Example 1, and also had a high ratio Kd/Ks of the dynamic spring constant to the static spring constant of 2.4. Furthermore, Comparative Example 3, which had only felt, had a dynamic spring constant Kd significantly lower than Comparative Examples 1 and 2, but also had a significantly lower static spring constant Ks. As a result, the ratio Kd/Ks of the dynamic spring constant to the static spring constant was very high at 4.8. Comparative Examples 1 to 3, each of which had only a soft layer, each have low rigidity and a ratio Kd/Ks of the dynamic spring constant to the static spring constant exceeding 1.5, so that the sound insulation performance between frequencies of 500 to 5000 Hz is also inferior to that of Examples.

INDUSTRIAL APPLICABILITY

According to the sound-insulation material for a vehicle of the present invention, the hard layer and the soft layer can increase the rigidity while maintaining the low weight, and can obtain sufficient sound insulation performance. More specifically, the sound-insulation material for a vehicle of the present invention is useful for a component that blocks noise between the noise source and the vehicle interior, such as a floor carpet, a floor spacer, a trunk trim, a trunk floor, a dash insulator, or an undercover.

REFERENCE SYMBOL LIST

1 Core material
10 Hard layer (core layer)
11 Ridge portion
12 Valley portion
13 Side surface portion
14 Bottom surface portion
15 Ridge portion connecting surface
16 Valley portion connecting surface
17 Top surface
18 Back surface of core material
20 Cell
21 Closed surface
22 Open end
30 Soft layer
50 Skin layer
60 Compression direction
70 Accelerometer
72 Mass plate
74 Vibration exciter
80 Film layer
90 Fiber layer
100 Panel

The invention claimed is:
1. A sound-insulation material for a vehicle, having a multilayer structure, the material comprising:
    a hard layer having tubular cells, the tubular cells being arranged in a plurality of rows wherein each of the cells in the hard layer has a closed surface at one end and an open end at another end, and the open ends of the cells are arranged on both sides of the hard layer such that rows of the open ends of the cells are in every other row; and
    a soft layer provided on one side of the hard layer,
    wherein the closed surfaces of the cells arranged in every other row serve as a surface for adhering the soft layer and the hard layer,
    wherein a ratio of a dynamic spring constant Kd to a static spring constant Ks, of a structure having the hard layer and the soft layer, is $0 < Kd/Ks \leq 1.5$.

2. The sound-insulation material for a vehicle, according to claim 1, wherein the static spring constant Ks of the structure having the hard layer and the soft layer is 20 N/mm or more, and the ratio of the dynamic spring constant Kd to the static spring constant Ks is $0.7 < Kd/Ks \leq 1.5$.

3. The sound-insulation material for a vehicle, according to claim 1, wherein a pitch Pcy between the cells in a direction in which the cells of the hard layer are adjacent to each other in a row is within a range of 4 mm to 10 mm.

4. The sound-insulation material for a vehicle, according to claim 1, further comprising a film layer between the hard layer and the soft layer, the film layer having a thickness in a range of 50 μm to 300 μm.

5. The sound-insulation material for a vehicle, according to claim 4, wherein the film layer has a plurality of apertures penetrating the film layer.

6. The sound-insulation material for a vehicle, according to claim 4, further comprising an additional layer between the film layer and the soft layer, the additional layer having a static spring constant Ks smaller than a static spring constant Ks of the soft layer.

7. The sound-insulation material for a vehicle, according to claim 6, wherein a material of the soft layer is urethane foam, the additional layer is a fiber layer, and a thickness of the fiber layer is in a range of 0.3 mm to 10 mm.

* * * * *